(12) United States Patent
Marston et al.

(10) Patent No.: US 9,121,082 B2
(45) Date of Patent: Sep. 1, 2015

(54) MAGNETO-PLASMA SEPARATOR AND METHOD FOR SEPARATION

(71) Applicant: Advanced Magnetic Processes Inc., Ipswich, MA (US)

(72) Inventors: Peter G. Marston, Ipswich, MA (US); William Davis Lee, Newburyport, MA (US)

( * ) Notice: Subject to any disclaimer, the term of this patent is extended or adjusted under 35 U.S.C. 154(b) by 90 days.

(21) Appl. No.: 13/675,573

(22) Filed: Nov. 13, 2012

(65) Prior Publication Data

US 2013/0118305 A1 May 16, 2013

Related U.S. Application Data

(60) Provisional application No. 61/557,951, filed on Nov. 10, 2011.

(51) Int. Cl.
*C22B 4/00* (2006.01)
*C22B 4/08* (2006.01)

(52) U.S. Cl.
CPC .. *C22B 4/005* (2013.01); *C22B 4/08* (2013.01)

(58) Field of Classification Search
USPC ........................................ 250/284
See application file for complete search history.

(56) References Cited

U.S. PATENT DOCUMENTS

| | | | |
|---|---|---|---|
| 3,692,626 A | 9/1972 | Ohkawa | |
| 3,722,677 A | 3/1973 | Lehnert | |
| 3,954,954 A | 5/1976 | Davis et al. | |
| 4,035,656 A | 7/1977 | Ohkawa | |
| 4,239,594 A | 12/1980 | Ohkawa | |
| 4,263,096 A | 4/1981 | Ohkawa et al. | |
| 4,263,097 A | 4/1981 | Ohkawa | |
| 4,269,658 A | 5/1981 | Ohkawa | |
| 4,277,306 A | 7/1981 | Ohkawa | |
| 4,305,784 A | 12/1981 | Ohkawa | |
| 4,469,508 A | 9/1984 | Amouroux et al. | |
| 4,543,231 A | 9/1985 | Ohkawa | |
| 4,560,528 A | 12/1985 | Ohkawa | |
| 4,665,412 A | 5/1987 | Ohkawa et al. | |
| 4,723,250 A | 2/1988 | Ohkawa et al. | |
| 4,734,246 A | 3/1988 | Ohkawa et al. | |
| 5,144,110 A * | 9/1992 | Marantz et al. | 219/121.48 |
| 5,149,681 A | 9/1992 | Ohkawa et al. | |
| 5,350,454 A | 9/1994 | Ohkawa | |
| 6,096,220 A | 8/2000 | Ohkawa | |
| 6,106,683 A | 8/2000 | Ohkawa | |

(Continued)

FOREIGN PATENT DOCUMENTS

WO 2010058188 A1 5/2010

OTHER PUBLICATIONS

Robert Thomas, A Beginner's Guide to ICP-MS—Part I, Spectroscopy, Apr. 2001, p. 38-42, vol. 16, Issue 4.

(Continued)

*Primary Examiner* — Phillip A Johnston
(74) *Attorney, Agent, or Firm* — Intrinsic Law Corp.; Ibrahim M. Hallaj

(57) ABSTRACT

A plasma separator and mass filter system is described. In some aspects the system is designed and configured to cause a plasma in a vacuum chamber and to move charged particles therein axially and circumferentially towards one or more sets of collectors. Waste material is ejected from the system while the one or more collectors yield one or more corresponding products.

18 Claims, 15 Drawing Sheets

(56) References Cited

U.S. PATENT DOCUMENTS

| | | |
|---|---|---|
| 6,139,681 A | 10/2000 | Ohkawa |
| 6,214,223 B1 | 4/2001 | Ohkawa |
| 6,217,776 B1 | 4/2001 | Ohkawa |
| 6,235,202 B1 | 5/2001 | Ohkawa |
| 6,248,240 B1 | 6/2001 | Ohkawa |
| 6,251,281 B1 | 6/2001 | Ohkawa |
| 6,258,216 B1 | 7/2001 | Ohkawa |
| 6,293,406 B1 | 9/2001 | Miller et al. |
| 6,294,781 B1 | 9/2001 | Ohkawa |
| 6,303,007 B1 | 10/2001 | Ohkawa |
| 6,322,706 B1 | 11/2001 | Ohkawa |
| 6,375,860 B1 | 4/2002 | Ohkawa et al. |
| 6,386,374 B1 | 5/2002 | Miller et al. |
| 6,391,081 B1 | 5/2002 | Uchikoshi et al. |
| 6,398,920 B1 | 6/2002 | Ohkawa et al. |
| 6,410,880 B1 | 6/2002 | Putvinski et al. |
| 6,576,127 B1 | 6/2003 | Ohkawa |
| 6,585,891 B1 | 7/2003 | Ohkawa |
| 6,619,925 B2 | 9/2003 | Ohkawa |
| 6,719,909 B2 | 4/2004 | Ohkawa |
| 6,723,248 B2 | 4/2004 | Ohkawa |
| 6,787,044 B1 | 9/2004 | Freeman et al. |
| 6,797,176 B1 * | 9/2004 | Ohkawa ........................ 210/695 |
| 6,939,469 B2 | 9/2005 | Ohkawa et al. |
| 6,956,217 B2 | 10/2005 | Ohkawa |
| 8,034,319 B2 * | 10/2011 | Suginobe .................. 423/594.2 |
| 8,043,400 B1 | 10/2011 | Stephens et al. |
| 2002/0134708 A1 | 9/2002 | Ohkawa |
| 2003/0071035 A1 | 4/2003 | Brailove |
| 2003/0183567 A1 | 10/2003 | Ohkawa |
| 2004/0031740 A1 | 2/2004 | Ohkawa |
| 2004/0251123 A1 | 12/2004 | Ohkawa |
| 2005/0172896 A1 | 8/2005 | Ohkawa |
| 2009/0035625 A1 | 2/2009 | Ohkawa |
| 2009/0260481 A1 | 10/2009 | Boulos et al. |
| 2010/0044483 A1 | 2/2010 | Foret |

OTHER PUBLICATIONS

Robert Thomas, A Beginner's Guide to ICP-MS—Part III: The Plasma Source, Spectroscopy, Jun. 2001, p. 26-30, vol. 16, Issue 6.

* cited by examiner

MAGNETO-PLASMA SEPARATOR AND METHOD FOR SEPARATION

TECHNICAL FIELD

The present disclosure relates to systems and methods for processing of multi-constituent materials, and in some instances to those for extracting metals from their ores and oxides.

RELATED APPLICATIONS

This application is related to and claims the benefit and priority of U.S. Provisional Application 61/557,951, filed on Nov. 10, 2011, entitled "Magneto-Plasma Separator and Method for Separation," to the present inventors and assignee, which is herein incorporated by reference.

BACKGROUND

Rare earth elements (REEs) and other high value strategic materials are elements whose unique properties are essential to the manufacture of high-tech industrial, medical, and military technology. The REE group is considered to include the lanthanide elements: lanthanum, cerium, praseodymium, promethium (does not occur naturally), neodymium, samarium, europium, gadolinium, terbium, dysprosium, holmium, erbium, thulium, ytterbium, and lutetium. The elements yttrium and scandium are also included as they have similar chemical properties. Other materials to which aspects of this application is directed include tantalum, titanium, tungsten, niobium, lithium, palladium, vanadium, zirconium, beryllium, thorium and uranium. The above materials are referred to herein as strategic materials for simplicity. Those skilled in the art will appreciate analogous and similar materials to which the present disclosure can be applied as well.

The REEs and the other strategic materials are used in our cell phones, computers, and televisions, as well as in hybrid automobiles, high speed trains, wind turbines, lasers, sonar and fiber optics. They are also important to national security, as they are used in the manufacture of guided missiles, communications satellites, radar, early warning systems, and countless other military and defense items.

Tantalum metal is an example of a high value material that is widely used in its elemental form but found in nature in the form of a salt or oxide compound. Tantalum is used to make steels with desirable properties such as high melting point, high strength, and good ductility. These find use in aircraft and missile manufacture. Tantalum is relatively inert and thus useful in the chemical and nuclear industries. The metal is also highly biocompatible, therefore, tantalum has widespread use for surgical use. For instance, it can be used in sutures and as cranial repair plates. The metal is also used in the electronics industry for capacitors.

Uranium, in its enriched form, is of particular interest as a fuel for nuclear reactors in both commercial and military applications. The overall flow sheet for Uranium includes mining, milling (to produce yellow cake), conversion, and fabrication. Each comprises a number of sub-steps. Following use of the finished product in a nuclear reactor, spent fuel may be reprocessed and/or stabilized and stored. Means for reprocessing spent fuel and management of high level nuclear waste is of substantial consequence.

U.S. Pat. No. 3,429,691 is directed to a method for reducing titanium dioxide powder to elemental titanium. The method combines titanium dioxide powder melted into droplets, and hydrogen plasma, producing liquid titanium and water at the other end of the chamber. The injected hydrogen plasma serves to both heat the titanium dioxide and remove the oxygen from the titanium by reduction. The reaction occurs in a compressing magnetic field in order to prevent the contents from contacting the sides and melting them.

In one example of current practice, Tantalum is produced by metallothermic reduction of one of its salts. At approximately 800° C., solid potassium heptafluorotantalate ($K_2TaF_7$) and liquid sodium are added to a halide melt (known as a "diluent") where they react to produce solid tantalum in the form of powder. The process involves many unit operations prior to the reduction step in order to convert ore to high quality feed. Then, the reduction step relies on a batch process involving very dangerous liquid sodium at temperatures approaching its boiling point (883° C.). The sodium is delivered to the reactor in large vessels (railway tank cars) and stored on site. In this reactor it is difficult both to control particle size and to prevent particle agglomeration, which is critical to the production of high-grade powder for use in capacitors.

The above systems generally require highly reactive liquid sodium and costly potassium heptafluorotantalate double salt feedstock, and lack continuous throughput, and are based on batch operation methods, and further lack the capability to control particle size in the product tantalum powder.

Generally, when the constituents of a mixture or the elements within a compound have an electric charge, one method of separating them relies on accelerating the charged particles and passing them through a magnetic field that is perpendicular to their velocity. This technique of separation separates the particles based on their mass-to-charge ratio.

U.S. Pat. No. 3,722,677 is directed to a device for causing particles to move along curved paths inside a cylindrical chamber using perpendicular electric and magnetic fields, for the purpose of separating the particles. In this invention electrodes can be placed at one or both ends of the confined volume. The positively charged particles will rotate around the central axis and impart this motion to the uncharged particles through collisions. The concentration of heavier particles will be greater at greater radial distances, thus allowing separation.

One way of creating charged particles in a mixture or a chemical compound is by raising the temperature of the material to above that of its gas phase. This transforms it to a state of matter called plasma that is similar to the gas phase except that it has been heated to the degree that some portion of the molecular constituents have lost some of their electrons and are said to be "ionized". The chemical bonds are broken thermally—the degree of ionization depends on the temperature. A plasma is thus comprised of charged particles—generally positive ions and negative electrons.

U.S. Pat. No. 6,096,220 ("Plasma Mass Filter"), a drawing from which is reproduced in FIG. 1, which is directed to a process and device 10 for filtering low mass particles from high mass particles in a plasma by means of injecting the plasma into a cylindrical chamber having a magnetic field aligned with the axis, and a perpendicular electric field so as to cause a rotational movement of charged particles in the chamber. The magnitude of the magnetic and electric fields are adjusted such that the high mass particles escape radially and collide with the cylindrical wall, while the low mass particles are confined to travel within the walls.

The general function of a filter is quite different from that of a separator. While the former generally requires only that all particles above a certain mass are trapped and all below such a mass pass through—momentum resolution is not a critical design or performance issue. The latter must cleanly separate and collect specific particles that represent the ionic constituents of a particular metal product. Moreover, it is often the case that there is not a large difference in the relative mass of the product particles. For these applications it may be helpful to obtain a measure or parameter related to momentum resolution.

U.S. Pat. No. 6,248,240 is a continuation in part of U.S. Pat. No. 6,096,220 and discusses a non-cylindrical chamber and a plasma source being located midway down the chamber. In addition it provides a method for maintaining a multi-species plasma at a low enough density such that collisions between the particles are relatively infrequent, and introduces one or more collectors positioned to intercept high mass particles.

U.S. Pat. No. 6,235,202 is another continuation in part of U.S. Pat. No. 6,096,220, which discusses injecting vaporized material into the chamber, and then ionizing it inside the chamber to create a plasma.

In some aspects, the present systems and methods improve mineral extraction efficiency, reduce the price of REEs and other high value strategic materials, and reduce the time required to bring a new ore body into production.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

The need for rare earth elements REEs and other high value strategic materials is increasing as the need for technology requiring them expands and becomes intrinsic to the well being of most of the world's population. New technologies for processing REEs and other high value strategic materials, more specifically with reference to the current application, for separating the metals from their ores and oxides, is required to meet this growing need. There is also a need for new technologies to further process the refined metals for improved alloys to reduce the cost and improve the performance of such products as batteries and high efficiency motors and generators. In some embodiments, the present systems provide improved mass resolution via the overall design configuration and aspect ratio, and control of the magnetic and electric field distributions.

Figure 1:
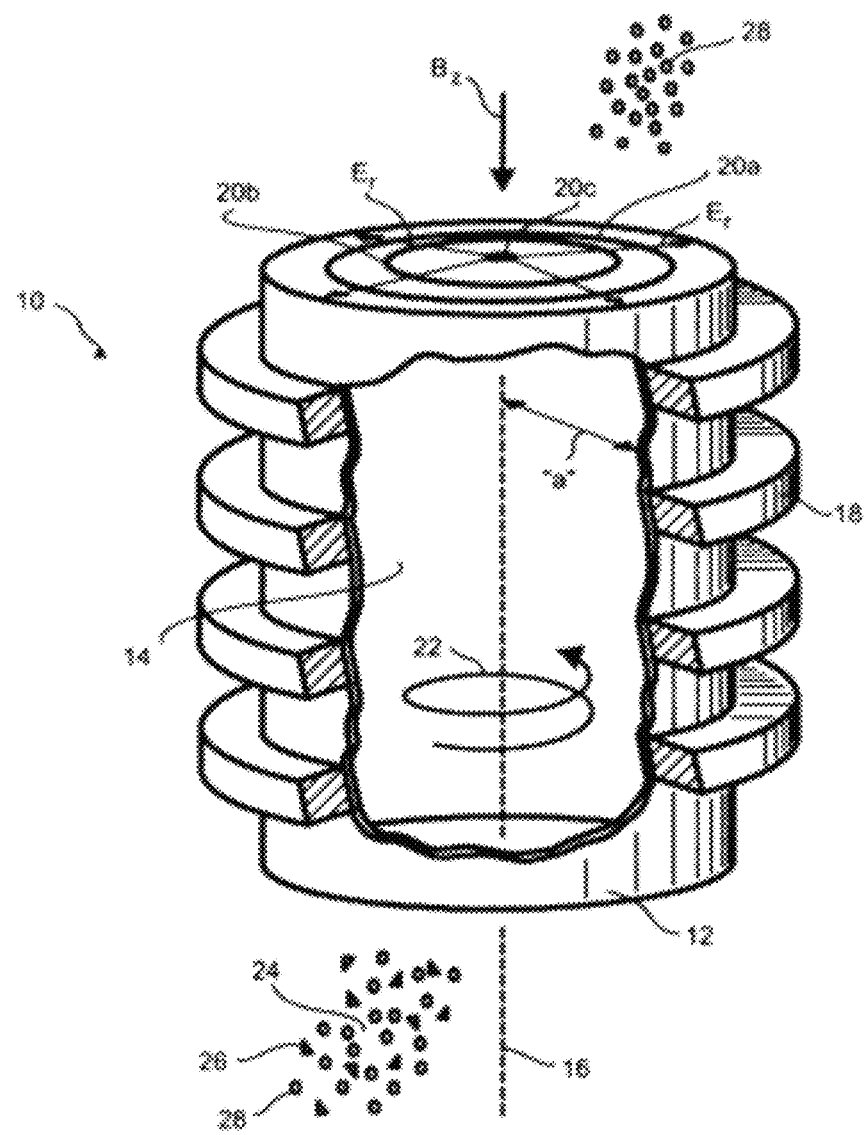
FIG. 1 shows a plasma separator according to the prior art, namely the afore-mentioned U.S. Pat. No. 6,096,220.
Figure 2:
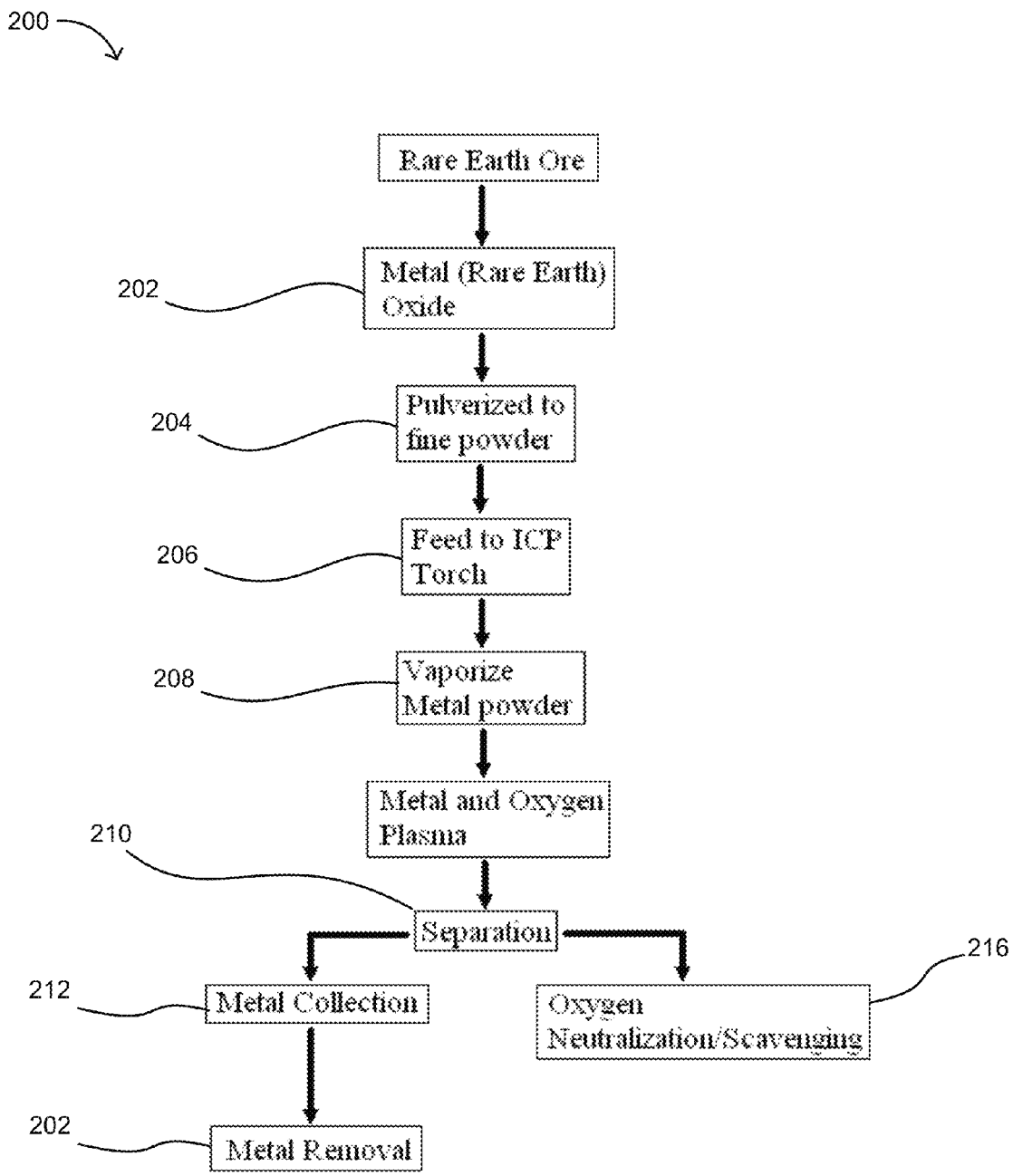
FIGS. 2-4 illustrate exemplary processes for refining a strategic material.

FIG. 2 shows an overview of one embodiment of a process or method (200) of obtaining a metal from its rare earth ore or oxide. As an example this can be performed to extract a rare earth metal from its metal oxide ore. A step (202) of obtaining a rare earth metal oxide from rare earth ore is performed. The process or method 200 further includes steps to pre-process the initial substrate including mechanical pre-processing, comminution, or pulverization (204) of the multi-constituent substance from the ore into a fine powder.

The powder is fed to a plasma torch at 206 where it is initially heated. The material to be refined is heated to a temperature at which it is vaporized at 208 and at least partially ionized and transformed to a state of matter known as a plasma, in this case a metal and oxygen plasma is created. The plasma may be generated by any of the various plasma generators already known to those skilled in the art, for example an inductively coupled plasma (ICP) source or torch.

Separation of the metal from oxygen is performed at step 210. For metal oxides the plasma typically contains at least the following: positive metal ions, positive oxygen ions ($O^+$), negative oxygen ions ($O^-$), and electrons. Neutralization of the oxygen and its removal can be performed, for example, using a reduction reaction such as using hydrogen reduction.

Collection of the metal and removal from the collector is achieved at step 212 and 214. Unwanted oxygen may be scavenged or neutralized at 216.

It should be appreciated that the above exemplary embodiment is provided for the sake of illustration. Those skilled in the art will understand that the above steps (as well as others given in other examples herein) may be substituted with equivalent steps, or may be omitted, or other steps may be included in addition to those described, as appropriate in a given context.

Figure 3:
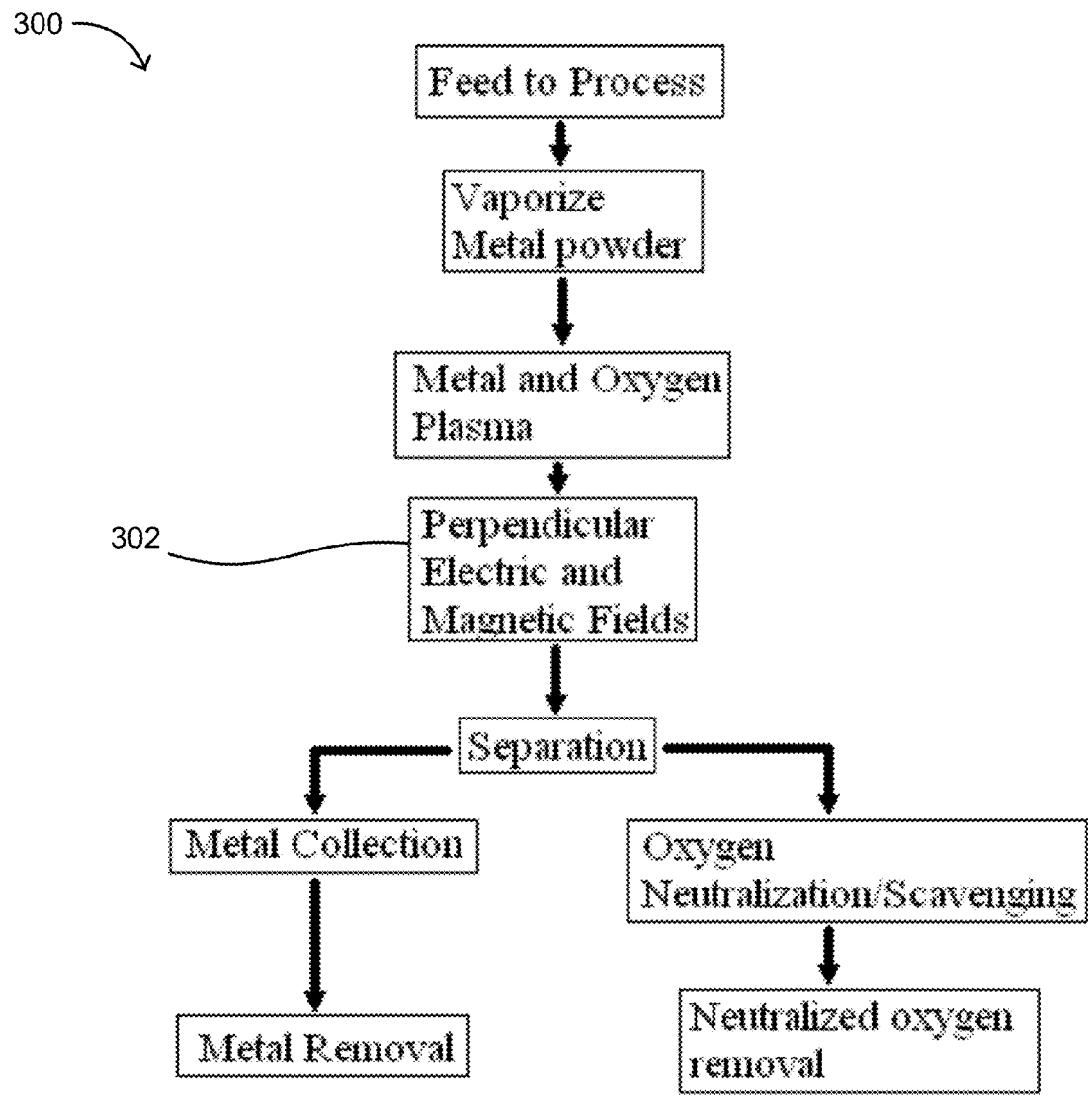
Figure 4:
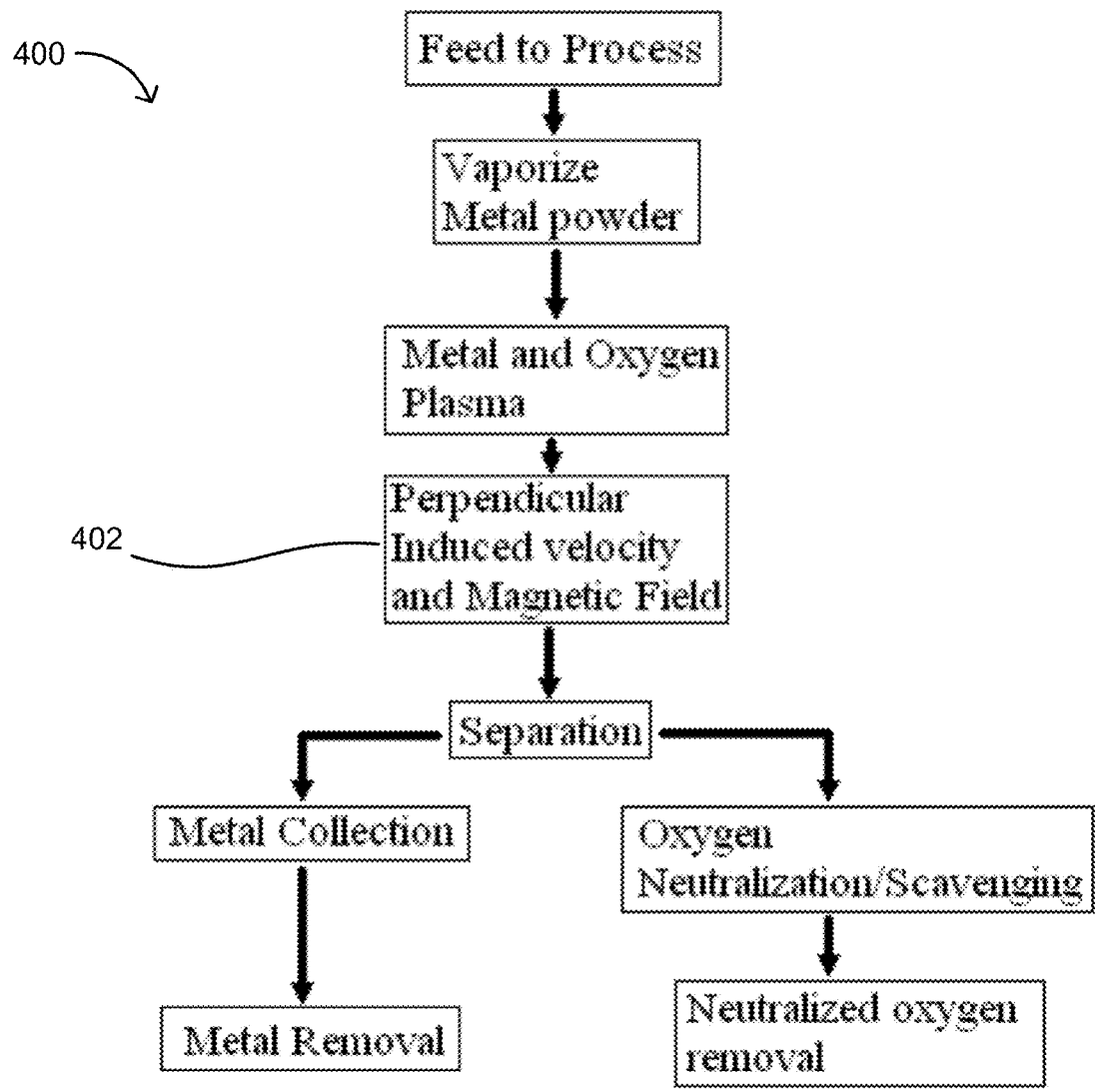

Separation of the charged particle constituents of the plasma is accomplished via a suitable configuration of electric and magnetic fields, or by Lorentz separation wherein the plasma is physically accelerated and directed through a transverse magnetic field. FIGS. 3 and 4 show flow charts describing these two respective embodiments of the process of refining a metal oxide. The method 300 of FIG. 3 includes a step 302 of applying a perpendicular electric field and a magnetic field to the charged contents of a plasma reactor chamber with respect to their axial trajectories, while the method 400 of FIG. 4 includes a step 402 of applying a perpendicular induced velocity and a magnetic field to said contents. The steps of the illustrated processes are given by way of example, and are not intended to limit the present scope as it would be understood by those skilled in the art.

Figure 5:
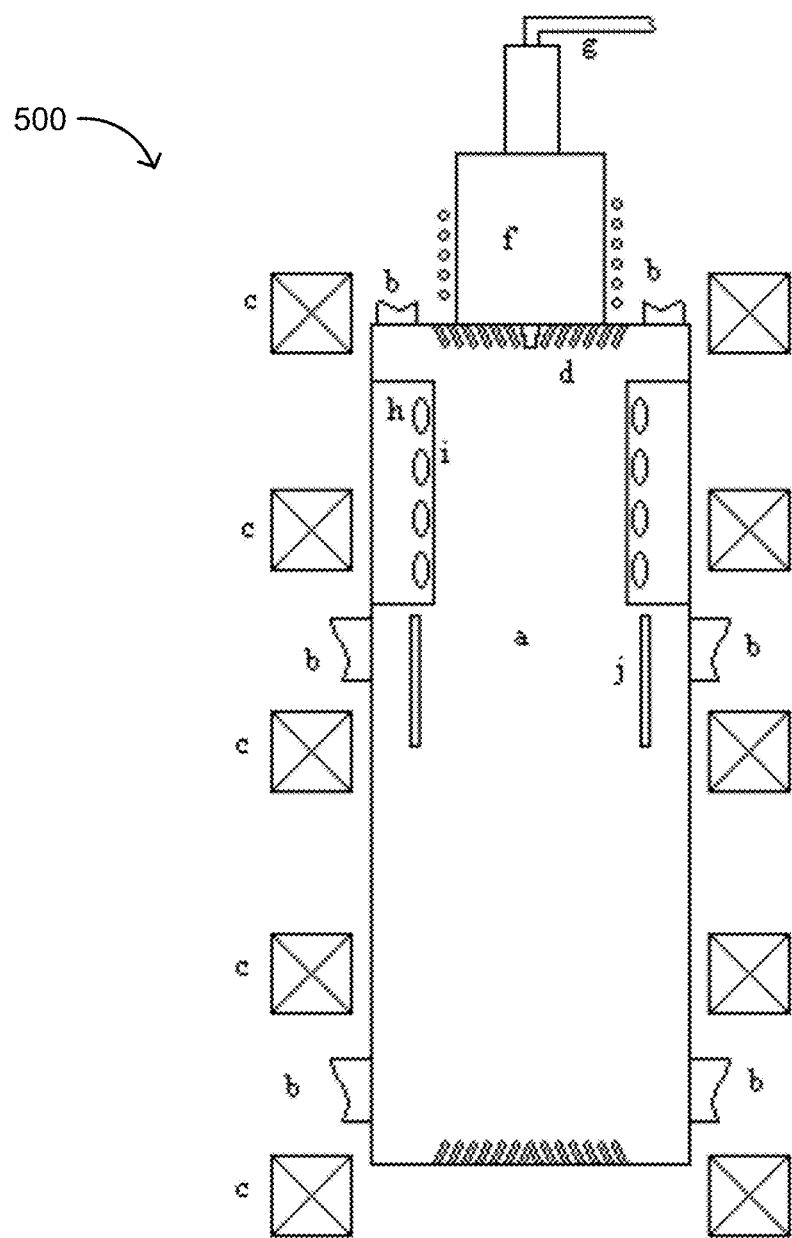
FIGS. 5-12 illustrate aspects of exemplary plasma separator systems shown in cross section.

FIG. 5 illustrates a cross sectional view of a magneto-plasma separator system 500 according to an embodiment. The system includes: (a) vacuum vessel, (b) vacuum pumping ports, (c) magnet coils, (d) supply side electrode, (f) plasma supply torch, (g) feed line, (h) RF coils, (i) RF enclosure, and (j) product collector.

The vacuum vessel (a) keeps the reaction in the filter at the right pressure and material concentration levels to insure that the process will proceed as desired.

Vacuum pumping (b) may be used to enhance the process throughput.

Magnetic coils (e) provide the axial magnetic field used for the process conditions.

The electrodes (d) will induce the correct voltage profile and hence a radial electric field for the required process conditions. In some embodiments, the radial voltage profile may be parabolic, thus imparting an electric field proportional to the radius.

A plasma torch (f) is used to supply the bulk plasma—following appropriate pre-processing into the main vessel or chamber of the system, the metal oxide to be refined is fed to the plasma torch where it is initially heated. In some embodiments, preheating of the feed materials prior to introduction into plasma torch (f) is preferred. In other embodiments, a plurality of such plasma systems are employed in series where a first system's exhaust is provided to a second system to recover heat energy from the first system that would otherwise be wasted and so as to preheat materials entering into the second system.

Feed stock (g) feeds to the torch—this insures the torch has the required feed to fuel the plasma, at an appropriate temperature and pressure.

Additional ionization, inside the vacuum vessel (a), can be provided by RF heating via the RF strap antenna (h). The RF system performs best if not immersed in the plasma—the RF antenna straps could be housed in an enclosure (i) that allows RF propagation, while prohibiting plasma from surrounding the RF launching structure.

Figure 6:
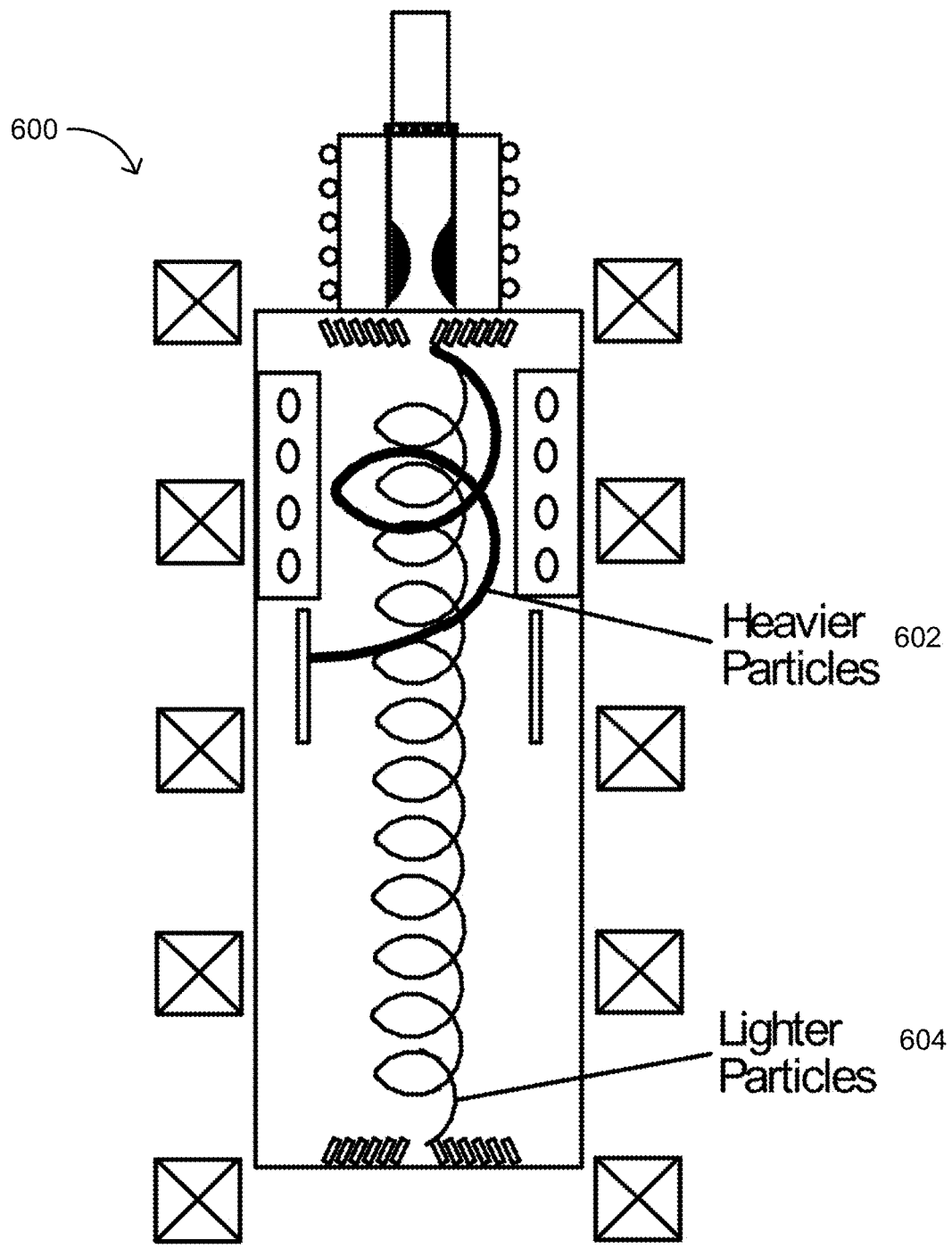

Separation of particles according to their mass to charge ratio is accomplished as illustrated in FIG. 6, which can be considered a baseline design for some embodiments. The crossed electric and magnetic fields induce an azimuthal rotation of the plasma (circular flow about the centerline of the reactor). The interaction of the azimuthal or radial motion of the charged particles in the plasma and the axial magnetic field creates a radial force on the individual charged particles. A Lorentz force is created that causes separation of various species or types of ionized material in the chamber according to their respective mass and charge. The Lorentz force (F) for such separation corresponds to a cross product of a particle velocity (v) of said charged constituent of charged matter, its charge (q) and the magnetic and electric fields (B) and (E) respectively in the chamber, according to $F=q(E+v\times B)$.

Velocity may be imparted to feed materials or ionized particles by physical action of a flow including said particles, mechanical forces, electromagnetic forces or other acceleration methods.

The higher mass species in the plasma represent the product being collected. Their trajectories are such that they migrate outward to the product collector (j) as described before. Low mass species are more tightly confined and discharged through the low field electrode at the bottom. Specifically, ions that are confined will travel axially, while those that are not confined will escape radially. In the case of separation of a metal from oxygen the cutoff mass falls between the mass of oxygen and the mass or masses of one or more materials to be separated from oxygen. The operation of the device can be achieved continuously. When sufficient product material is collected on collector (j) it can be harvested for use or post processing. For example, the collector and its collected product can be removed as a cartridge system and a fresh collector cartridge installed for continued operation of the system.

Unit processes that can benefit from the magneto-plasma process include mining (in particular heap-leaching), milling (solvent extraction) and conversion and enrichment (isotope separation). Post use reprocessing and high level waste stabilization and storage can also benefit as can the problems of mine reclamation and aquifer restoration. The same or similar benefits can accrue to the processing of rare earths and their related waste products and environmental challenges.

Additional embodiments below are intended to address the issue of improving the mass resolution of the separator by virtue of the specific design and distribution of the magnetic and electric fields. High mass resolution performance of the MPS is important to not only the purity (and value) of the final metal product but is also critical to the ability to separate the different rare earth constituents of certain ores and/or minerals.

FIG. 6 illustrates simplified a separator system 600 showing exemplary trajectories for particles of differing masses and charge values passing through the system of FIG. 5. The particles 602, 604 are separated by mass, or by their relative masses and charge values, so that they terminate at different pre-designed locations in the system 600. The products of interest can be designed to collect on the collector(s) described previously, whereas unwanted or waste materials can be discharged or collected on other collectors.

Figure 7:
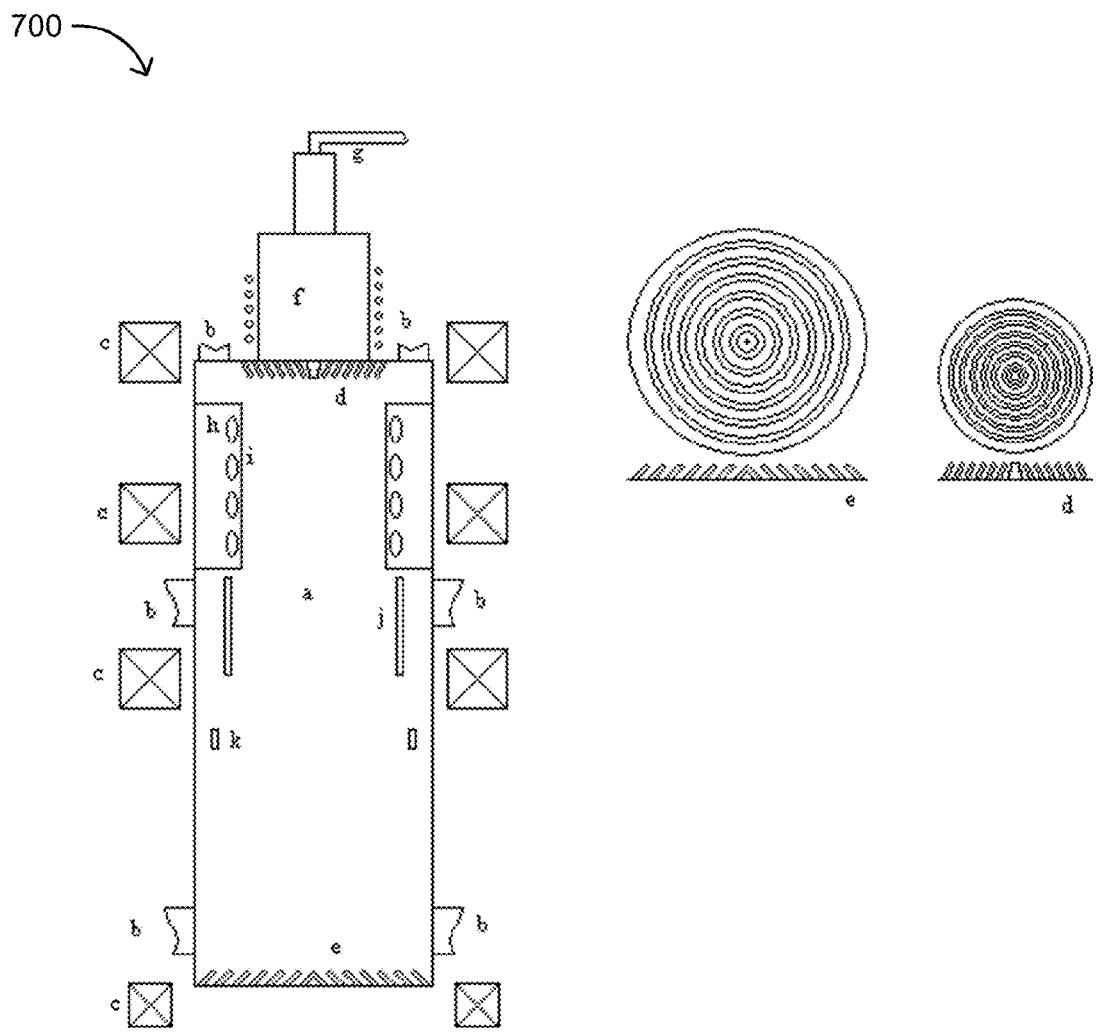

An alternate embodiment might include designs such as the addition of a mid-stream reagent, adiabatic cooling of the waste material, for reaction with the mid stream reagent. FIG. 7 illustrates another embodiment of a magneto-plasma separator with additional elements. Components include: a) vacuum vessel, b) vacuum pumping ports, c) magnet coils, d) supply side/high field electrode, e) collector side/low field electrode f) plasma supply torch, g) feed line, h) RF coils, i) RF enclosure, j) product collector, k) reagent addition structure. The axial magnetic field could vary along the length of the machine to adiabatically cool the plasma. In the example shown, the lower coils have been removed or reduced in strength to allow for adiabatic expansion in this region, also the electrode has been made larger in radius to accommodate the expanding magnetic field.

Figure 8:
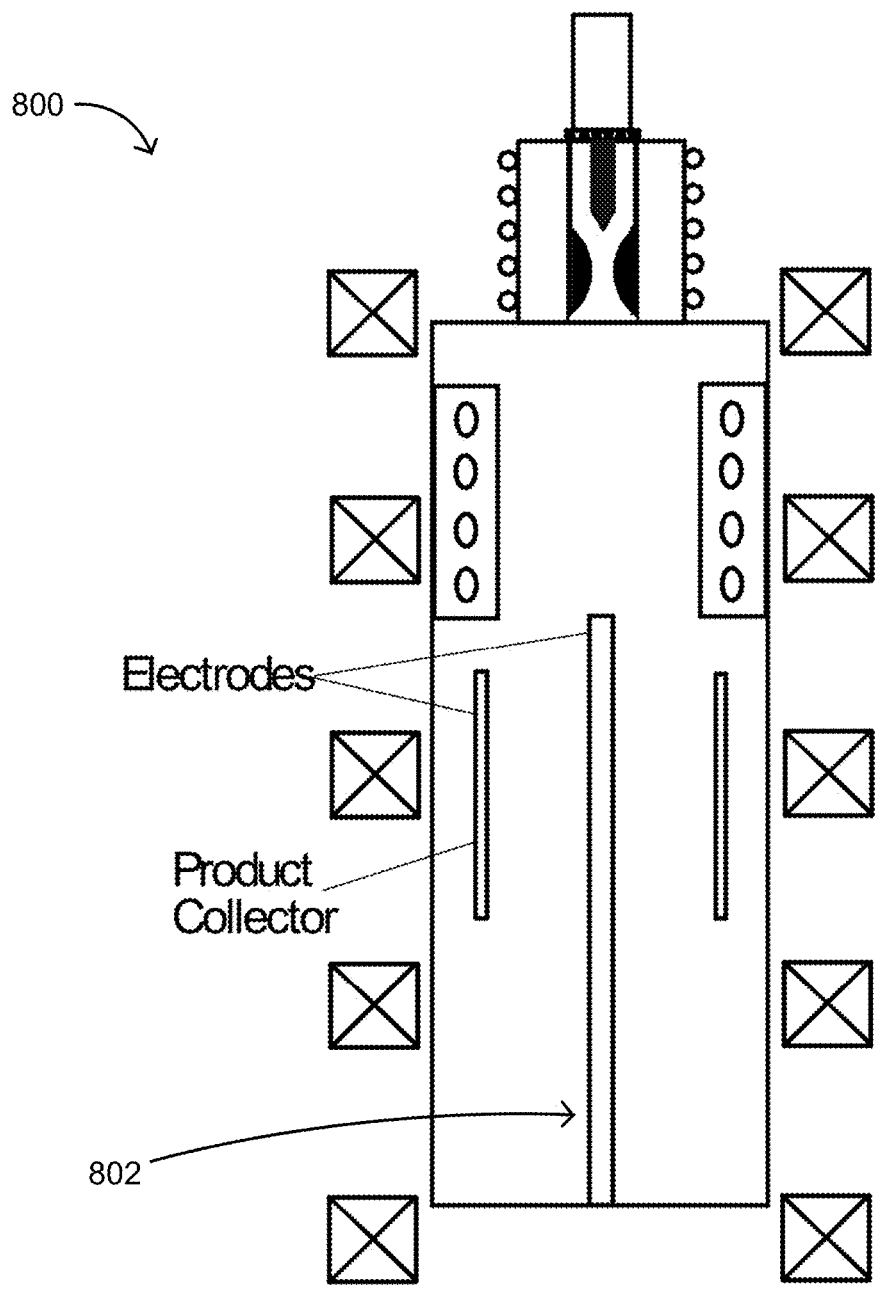

FIG. 8 illustrates an embodiment 800 incorporating a solenoidal design similar to the baseline design except that the electrodes consist of a single central rod (or wire) and the outer product collector. The electric field will have a 1/R distribution at all axial locations. A center electrode 802 is included to modify the internal channeling of the ionized contents of the system 800.

Figure 9:
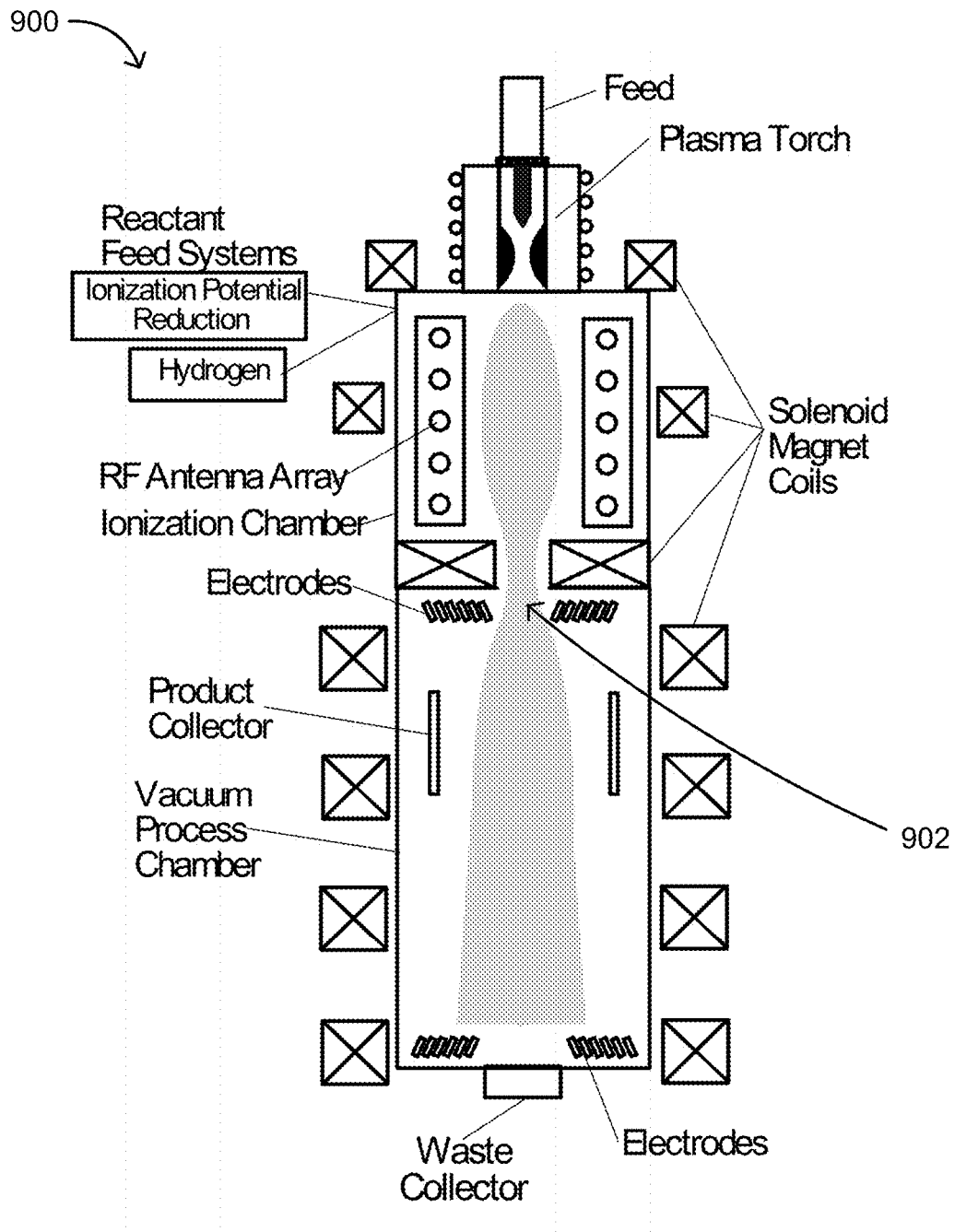

Another option, shown in FIG. 9, is to configure the magnetic field such as to add a "plasma pinch" at a region 902 within the system 900 to provide a well-defined entrance of the fully ionized plasma into the separation region (at the centerline), reducing the cross sectional area of the plasma in the chamber. This embodiment may also include the central electrode 802 design of FIG. 8.

Figure 10:
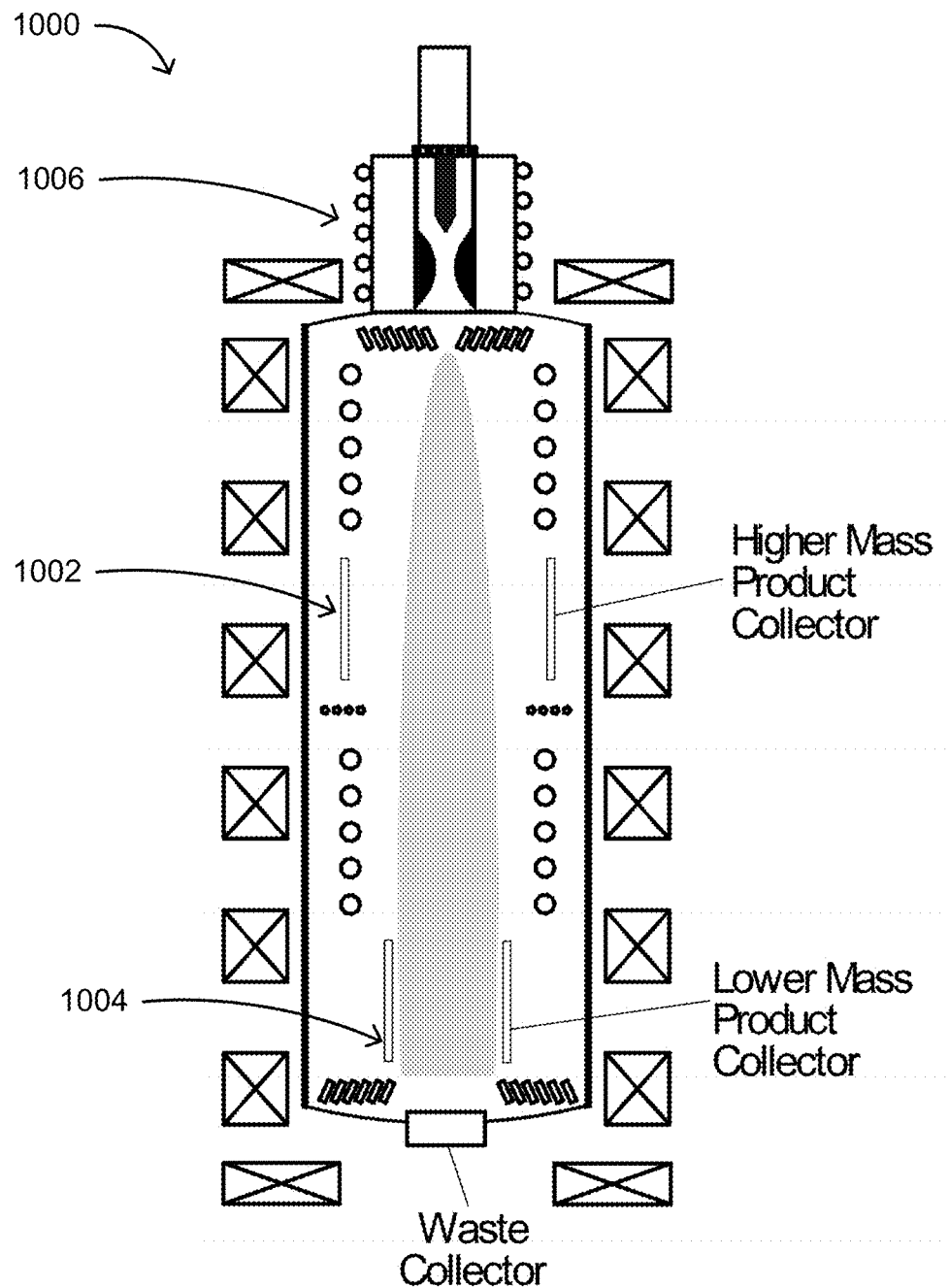

In another embodiment, a plasma reaction system 1000 includes multiple collectors 1002, 1004, here disposed at varying axial distances from plasma source 1006. FIG. 10 illustrates one example with two collectors—one for higher mass and the other for lower mass particles. This device would thus operate as a Mass Rejection Filter. This system may also benefit from the central electrode and plasma-pinch concepts of FIGS. 8 and 9.

Figure 11:
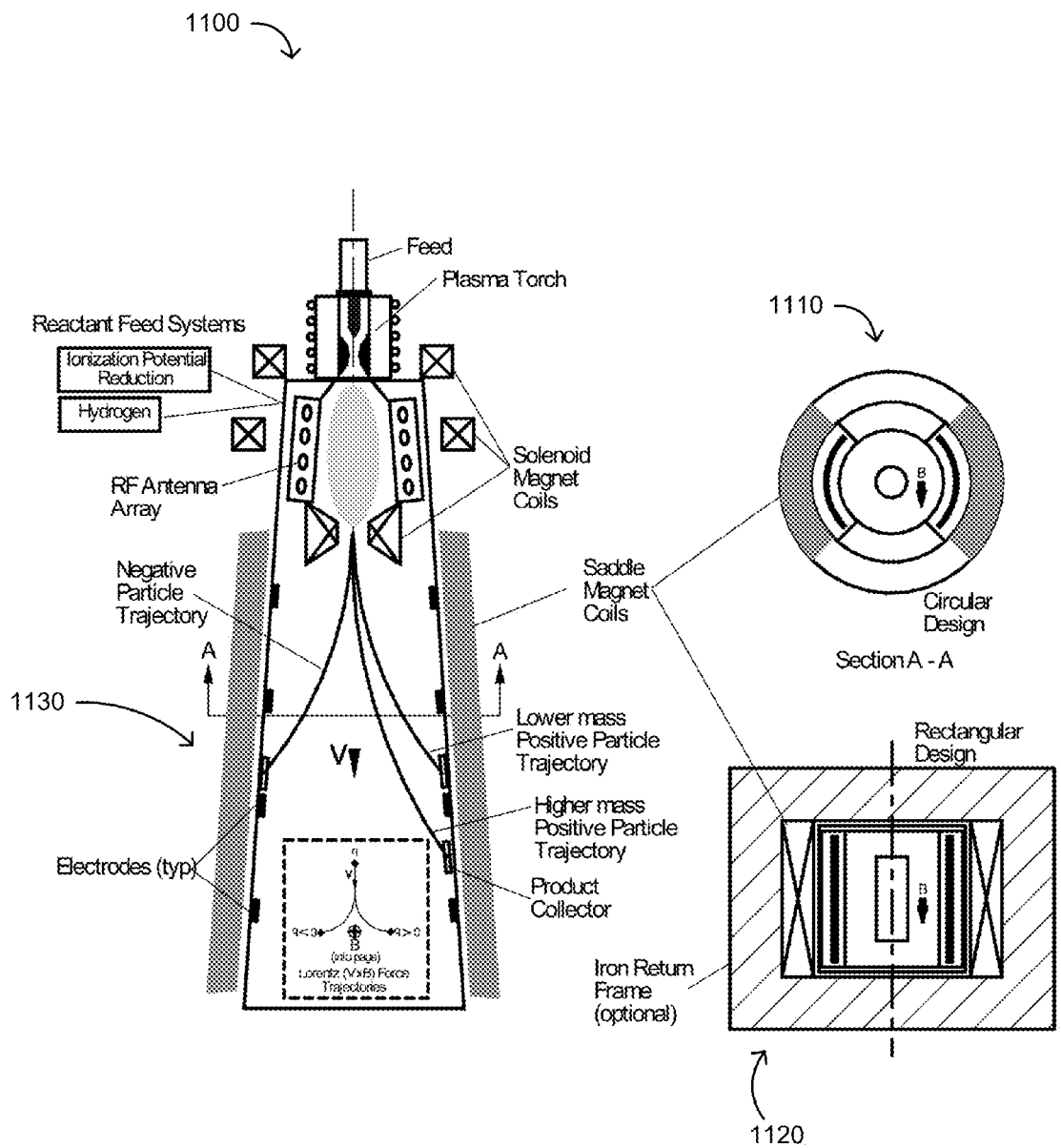

FIG. 11 shows another embodiment 1100 having either a circular or a rectangular design for a linear (transverse B field) system. This system is shown with a plasma-pinch at the discharge end of the ionization region. This design provides excellent mass resolution and can have a cylindrical 1110, expanding area 1130 and/or rectangular 1120 cross section. In the case of the rectangular design, is capable of high throughput. The rectangular design 1120 can benefit from the use of a planar plasma torch to better accommodate a large aspect ratio rectangular aperture between the "ionization" and the "separation" regions of the magneto plasma separator (MPS).

Figure 12:
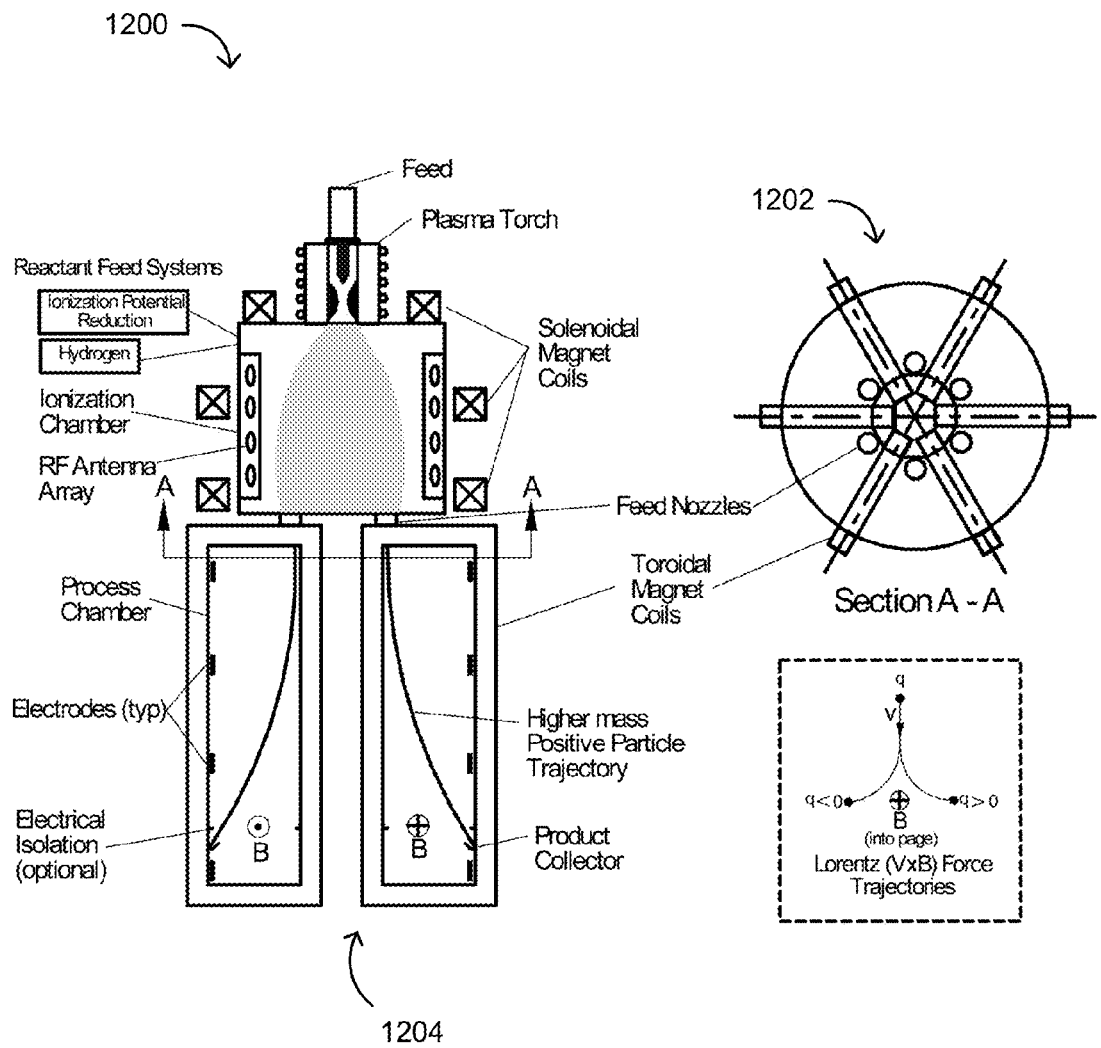

FIG. 12 shows another embodiment incorporating a toroidal magnet 1202 design (azimuthal B field 1204).

Figure 13:
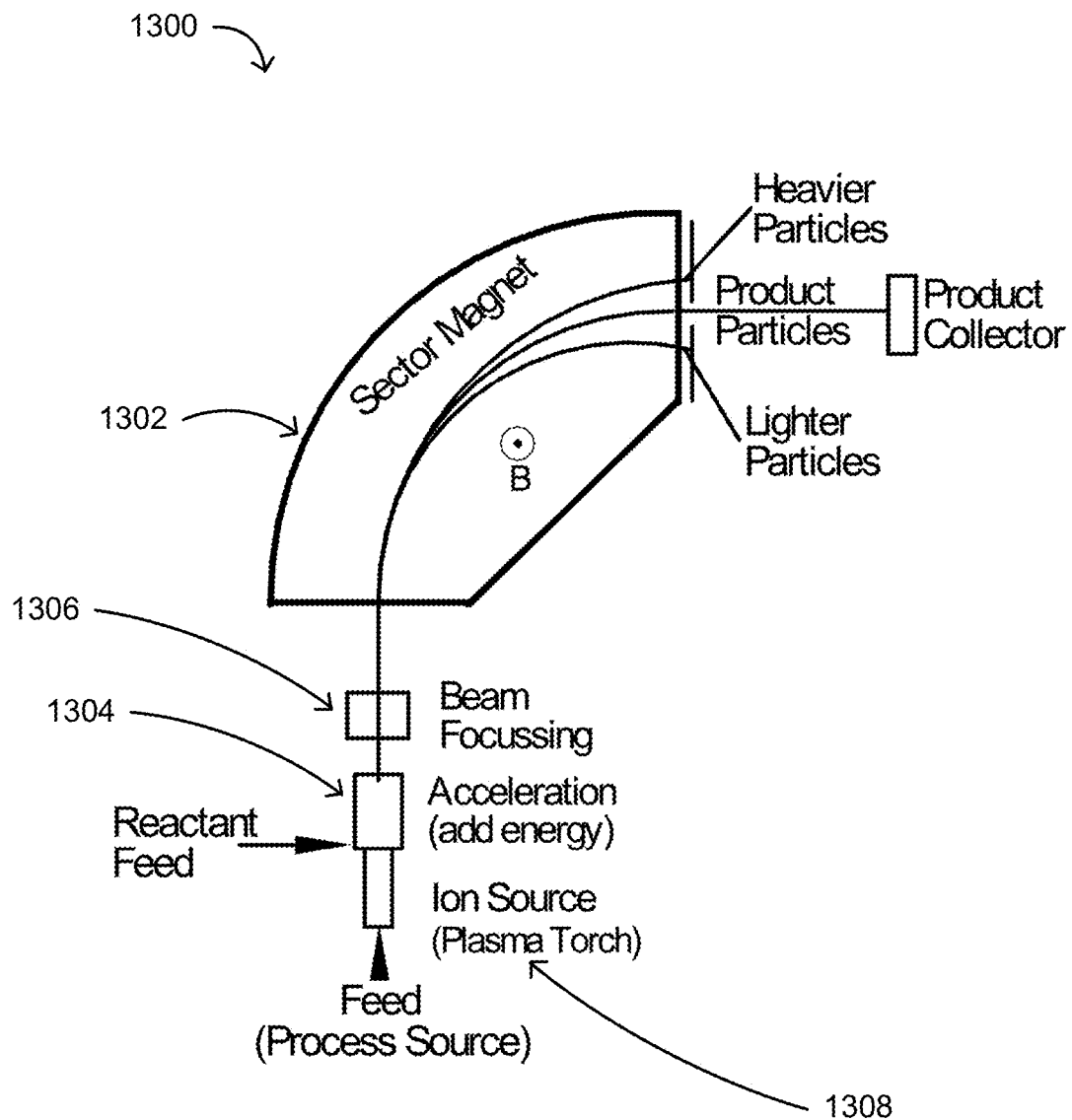
FIG. 13 illustrates acceleration and separation of components of various mass in a sector magnet of a plasma separator system.

FIG. 13 shows an alternate design incorporating a sector magnet 1302. This is similar to the linear design except that only positive ions would be accelerated through the system and the central ray would be deflected through a full 90 degrees. This discussion is meant for the sake of illustration, and those skilled in the art would understand the generalization of the present examples. The apparatus 1300 provides very high mass resolution. The discharge beam-line can include an electric or magnetic field "kicker" to periodically deflect the product beam to alternate collectors to facilitate recovery of the product metal from the inactive collector.

Note that an accelerator 1304 and/or a beam focusing device 1306 can be introduced in the reactant feed stream, for example proximal to the plasma source (torch) 1308. Further steering and collimating of separated species of products can be achieved as well, e.g., downstream of the reaction zone.

Another alternate embodiment involves the use of the disclosed technology as a sharp filter function for clean and well defined mass rejection using a multi stage system. For example, two or more such filters could be used in series, tuned to different cutoff masses. For example: If mass of 180 amu were desired, we might set the first filter up as a low pass filter and set the magnetic and electric fields such that the cutoff mass, from equation (1), was 185 amu. Thus, everything with a mass below 185 amu would end up at the distal end of the plasma column, while the ions with mass over 185 amu would end up on the heavy product collector.

Now a second filter could be employed, where the feed stock was from the light collector of the first filter. This filter might have its cutoff—everything in the feed stock that was heavier than 175 amu would end up on the heavy product collector, while only things with mass less than 175 amu would end up on the distal light product collector. In this way the system is set up as a mass rejection filter (a notch filter analog) and could be used specifically to separate out an element from an ore in which it was found. In this case some of the ions, either positive or negative or both, could be fluorine. Again, the specific examples above can be extended to others and those skilled in the art will appreciate this upon review of this disclosure.

The above illustrative examples generally are provided as guides to those skilled in the art and are not limiting in their express or implied description of the embodiments covered by this disclosure or invention. Other geometries, dimensions and material properties may also be used in the present context without loss of generality or understanding.

Various aspects of the following design parameters on the operation of the magneto-plasma separator include the following aspects:

Collectors and collection system: for example, the product collector shown in FIG. 4(j) is situated at a radius greater than that of the plasma column, and at an axial distance commensurate with the flow velocity, and the product radial loss velocity, there will be a collector for the product. Generally, if a product is collected on a surface, the interface between the product and the surface, on which it was collected, can become strongly bonded. Exemplary methods and devices for removal of this product from a collector are presented in section (I) below.

The geometry, size and aspect ratios of the chamber. The vertical orientation might allow certain conveniences in the source torch, however horizontal configurations should not be ruled out.

The optimal magnitude and distribution of electric and magnetic fields. This is investigated in section (II) below.

Operating temperature for obtaining optimal ionization profiles of all elements to be separated. The operating temperature range required for, and unique to, oxygen, is one of the issues unique to and addressed in this disclosure—see section (III) below.

Figure 14:
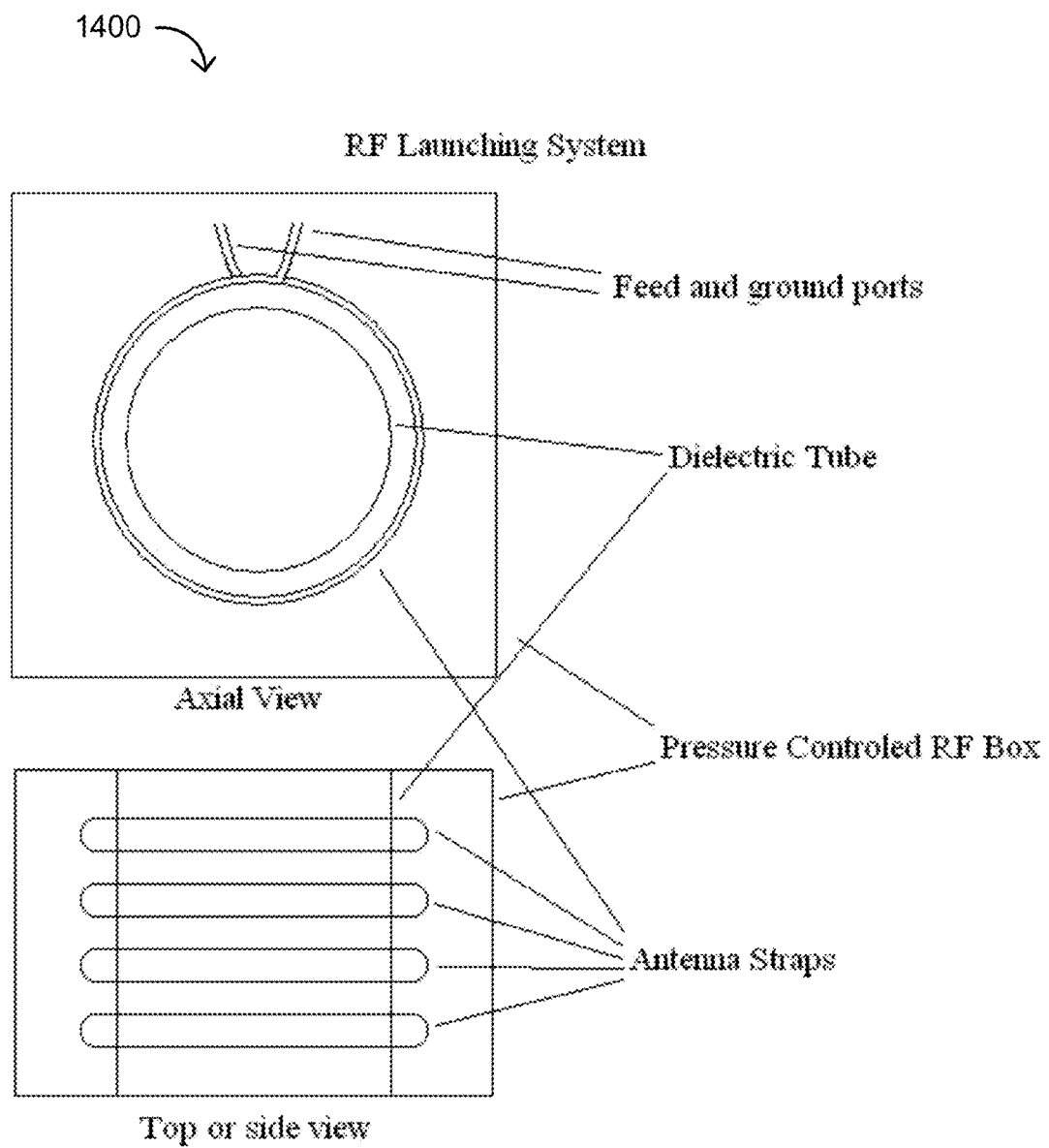
FIG. 14 illustrates an exemplary RF launching aspect of a plasma separator system.

RF launching system, its frequency range and power: The plasma can be heated by RF power within the chamber to maintain ionization levels. An exemplary embodiment of an RF launching system 1400 as shown in FIG. 14.

Oxygen scavenging and/or removal: for example, adding hydrogen to the plasma specifically to neutralize or negate the corrosive effects of the ionic, atomic or diatomic oxygen is one option. This subject is discussed further in section (IV) below. Further aspects of the present system and method are described as follows.

(I) The Product Collector and Product Removal from a Product Collector

One such method would be to use the different coefficients of thermal expansion (CTEs) of the product and the collector material to release the product from the collector. CTEs of various materials of interest are tabulated below in Tables 1 and 2.

TABLE 1

Coefficients of thermal expansion, CTEs, for some elements of interest.

| Element | Symbol | atomic number | CTE (mm/m K) |
|---|---|---|---|
| Scandium | Sc | 21 | 10.2 |
| Yittrium | Y | 39 | 10.6 |
| Lanthanum | La | 57 | 12.1 |
| Cerium | Ce | 58 | 6.3 |
| Praseodymium | Pr | 59 | 6.7 |
| Neodymium | Nd | 60 | 9.6 |
| Promethium | Pm | 61 | 11 |
| Samarium | Sm | 62 | 12.7 |
| Europium | Eu | 63 | 35 |
| Gadiolinium | Gd | 64 | 9.4 |
| Terbium | Tb | 65 | 10.3 |
| Dysprosium | Dy | 66 | 9.9 |
| Holmium | Ho | 67 | 11.2 |
| Erbium | Er | 68 | 12.2 |
| Thulium | Tm | 69 | 13.2 |
| Ytterbium | Yb | 70 | 26.3 |
| Lutetium | Lu | 71 | 9.9 |
| Tantalum | Ta | 73 | 6.3 |

TABLE 2

Coefficients of thermal expansion, CTEs, for some other materials of interest.

| Material | CTE (□m/m K) |
|---|---|
| Inconel | 12.6 |
| 316 SST | 16 |
| 310 SST | 14.4 |
| Invar | >2 |

In one embodiment, the collector is run, in the separator at a temperature substantially different from room temperature, e.g. cooled to cryo temperatures with $LN_2$, (or heated to a few hundred degrees centigrade). As the collector cools down (or heats up) it contracts (or expands). Once the separation process is complete and it is desired to remove the product, the collector is allowed to return to room temperature. The product and the collector material have different or ideally substantially different CTEs. As the collector heats up to room temperature (or cools down to room temperature), it expands (or contracts) inducing substantial stresses in the product that has collected. These stresses internal to the collected product cause it to flake off the collector.

In another embodiment, the collector would be run in the machine at about room temperature, or a temperature, not far from this. At such a time that is was desired to remove the product from the collector, the collector could be cooled to a very low temperature (cryo temperatures with $LN_2$) or heated to a high temperature, likewise making use of the internal stress in the product due to the thermal contraction or expansion, to release it from the collector.

In another embodiment, the removal might be achieved by physical bombardment. One method for doing this is to use a low temperature solid, that either sublimates or melts and then evaporates easily at STP (standard temperature and pressure, i.e. 20° C. and 760 Torr), as a bead in a bead blasting system.

$CO_2$ pellets, or beads, are frequently used in cleaning applications to remove material without contaminating either the work piece from which the material is being removed, or the material that is being removed from the work piece. $CO_2$ gas is converted to solid pellets, "dry ice" these pellets are then pressurized and launched at great speed through a nozzle and their momentum is used to blast away deposited material. The residual pellets and the removed deposited material can be collected elsewhere. The $CO_2$ pellets will sublimate, as $CO_2$ is a gas at STP, the remaining material will be whatever was deposited and then removed by the bombardment of the pellets.

$CO_2$ is only one possible substance that might be used for this process. Other relatively inert substances, for example, solid argon, solid hydrocarbons, solid alcohols, water ice, etc. Any material that can be made solid, blasted at the collector from a magneto-plasma separator, and then evaporated away, either at STP or with the addition a reasonably small amount of heat, in the case of water ice, for example.

In another embodiment, ultrasonics are used to free the product from the collector. After the magneto-plasma separator has run for a given amount of time, the collector will be covered with product. The collector would then be removed from the separator. At this time, the collector would be exposed to ultrasonic mechanical vibrations. This would cause the product that has plated the collector to break free, and fall off to be collected elsewhere, as a high purity product.

In another embodiment, the high purity product is collected on a surface that is made of the same material as the product, of equal or higher purity, after collection of the material, the collector itself, product and all, can be pulverized or otherwise converted to an appropriate form for sale.

The product collector might be a complicated geometry, made entirely of the product material. In a different embodiment, the collector might be a foil formed or stretched over a collector form. Thus the initial material requirement for the collector covering will be reduced. Alternately, the collector might be covered with a powder of the product material, or a powder of the product material in a suitable bonding agent. Alternately, the foil or powder covering might be something that is very easily separated from the product material by other means, chemical, large temperature variation, etc. Alternately, the foil or powder covering might be made of a material that is acceptable as a contaminate in the product material.

In another embodiment, the walls of the product collector are covered with a very low vapor pressure liquid that is allowed to flow, by gravity, down the walls of the collector. As the product is generated, it will escape radially, and become lodged or embedded in the liquid of the walls. This liquid will then be circulated through a pumping system that will include a pump, a valve or series of valves that allow the liquid to be introduced into and removed from the vacuum process chamber, and one or more filter elements to remove the product from the liquid. In this way the magneto-plasma separator can be run continuously, and the product continuously removed from the vacuum process chamber.

Figure 15:
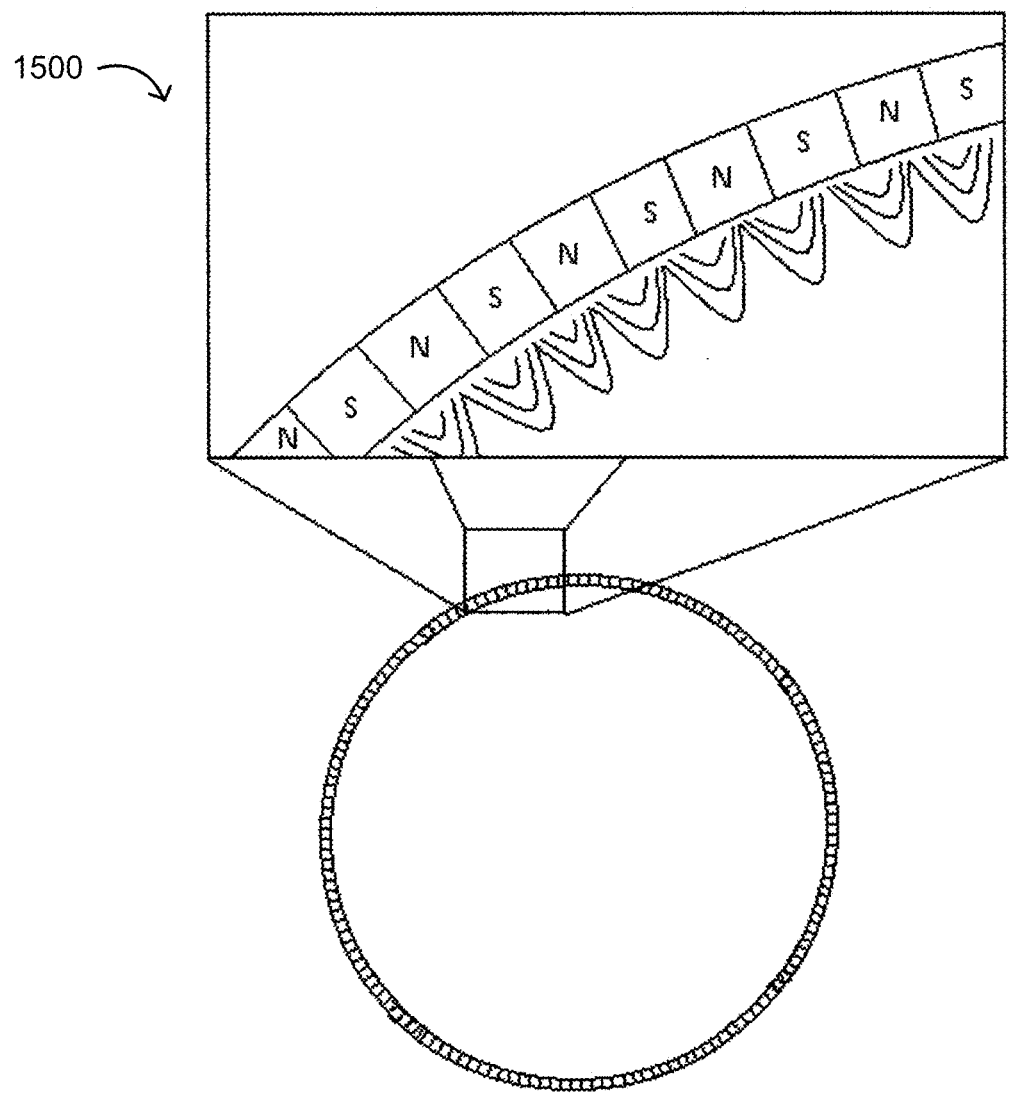
FIG. 15 illustrates an exemplary permanent magnet array providing a cusp field in an aspect of said plasma separator systems.

In another embodiment, around the outer edge of the product collector, permanent magnets are oriented such that adjacent magnets have opposite polarity facing radially inward. This creates a cusp field at the surface of the heavy ion collector that will turn away the lighter ions and pass the heavier ions. FIG. 15 shows an example of such a cusp confinement field. If the field strength and cusp geometry are chosen correctly, this field can help to turn around stray light ions while allowing heavy ions to penetrate the field and be collected. The cusp configuration will not perturb the axial magnetic field at a reasonable distance. The cusp geometry will allow a relatively intense field close to the collector with a minimal perturbation to the axial magnetic field at farther distances. This will allow the collector to turn away light ions at close range without disrupting the electric and magnetic fields in the main plasma column, required for separation. In this way, the cusp field should allow for a higher purity product to be collected at the product collector. The alternate polarity poles of the permanent magnets 1500 can be arrayed circumferentially (as shown in FIG. 15) or axially along the length of the product collector.

The approaches detailed above will allow collection of the material in a manner that is easy to release from the collector to generate suitable product in commodity form, available and suitable for the open market.

(II) Determination of Geometry and Operating Field Strengths

The following calculations of electromagnetic fields pertain to the first embodiment of the magneto-plasma separator, previously denoted as the "baseline" design. The first item to be investigated is the "filter function" of the magneto-plasma separator, in an embodiment whereby the plasma is accelerated via an electric field. This is the equation governing the physics of filtering materials in this device. The filter function determines operating parameters, ($B_0$ is the axial magnetic field in Tesla, $V_c$ is the peak voltage on the axis in Volts, a is the radius of the filter in meters) for a desired ion mass cutoff, $A_c$. The filter function is derived from the balance of radial forces, and can be written as follows:

$$A_c = \frac{M_i}{ZM_P} = \frac{eB_0^2 a^2}{8\, V_0 M_P} \quad [1]$$

where $A_c$ is the cutoff mass in amu, $M_i$ is the cut off ion mass in kg, Z is the charge state of the ion, $M_p$ is the mass of the proton in kg, and e is the charge of the electron in Coulombs. This complex frequency ratio is interpreted to mean that the ions above this mass would no longer be confined in this geometry with these fields. Table 3 shows the effective mass of some materials of interest, including oxygen, as a function of their ionization state.

TABLE 3

Mass to charge ratio or effective mass of materials of interest.

| | Charge State | | | |
|---|---|---|---|---|
| Ion | 1 | 2 | 3 | 4 |
| O | 16 | 8 | 5.333333 | 4 |
| Ta | 180.9 | 90.45 | 60.3 | 45.225 |
| La | 138.9 | 69.45 | 46.3 | 34.725 |
| Nd | 144.2 | 72.1 | 48.06667 | 36.05 |

(III) Determination of Operating Temperature

Next, the ionization fraction of oxygen (O), tantalum (Ta), lanthanum (La), and neodymium (Nd) as a function of temperature will be calculated with the latter three chosen as examples of target mineral substrates. These examples are given for the sake of illustration. Those skilled in the art will appreciate that many other examples and embodiments are also possible and fall within the present scope.

These ionization data will allow a suitable choice of operating temperature that will insure that the majority of the oxygen is ionized and thus filtered out. It is imperative that the oxygen be ionized to a level above what it expected for the purity of the final product. For example if the final metal product is to be 99.99% pure, better than 99.99% of the oxygen needs to be ionized. This will have implications on the metals and generally they will be in higher ionization states than the oxygen. Table 4 below summarizes the known ionization potentials in electron volts (eV) for some elements of interest.

TABLE 4

Ionization energies (eV), for ionization states of O, Ta, La, and Nd. Data for the higher ionization states of the metals is scarce.

| Energy (eV) | Ionization State | | | | |
|---|---|---|---|---|---|
| Element | 1st | 2nd | 3rd | 4th | 5th |
| Oxygen | 13.62 | 35.117 | 54.934 | 77.413 | 113.889 |
| Tantalum | 7.54 | ~15.5 | ~25 | — | — |
| Lanthanum | 5.5769 | 11.06 | 19.1773 | 49.95 | 61.6 |
| Neodymium | 5.525 | 10.73 | 22.1 | 40.41 | — |

The ionization fraction as a function of temperature can be calculated for these particular elements of interest, using the Saha equilibrium equation:

$$\frac{n_{j+1}}{n_j} = \frac{2Z_{j+1}}{n_e Z_j}\left(\frac{2\pi m_e kT}{h^2}\right)^{3/2} e^{-\chi_{j+1}/kT} \quad [2]$$

where $n_j$ is the number density of the $j^{th}$ charge state in m$^{-3}$, $Z_j$ is the partition function for the $j^{th}$ state, $n_e$ is the number density of electrons in m$^{-3}$, $m_e$ is the mass of the electron, k is the Boltzmann constant, T is temperature in K, h is Planck's constant and $\chi_{j+1}$ is the $j+1^{th}$ ionization potential in eV.

Because all atoms involved must end up in one charge state or another it follows that:

$$1 = \frac{1}{N}\sum_{i=0}^{Z} n_i \quad [3]$$

where N is the total number density of all atoms of a given species, Z is the total charges of the species, i is the ionization state where, in spectroscopic notation, 0=I, 1=II, 2=III, etc., and n, is the number density of charge state i. This series provides the following equality that defines the ionization fraction of each charged state:

$$1 = \frac{n_0}{N} + \frac{n_1}{N} + \frac{n_1}{N}\frac{n_2}{n_1} + \frac{n_1}{N}\frac{n_2}{n_1}\frac{n_3}{n_2} + \ldots \quad [4]$$

$$\Rightarrow \frac{n_1}{N} + \frac{\left(1-\frac{n_0}{N}\right)}{\left(1+\frac{n_2}{n_1}+\frac{n_2}{n_1}\frac{n_3}{n_2}+\ldots\right)}$$

The neutral fraction, $n_0/N$, can be estimated as follows. One can assume there is only one ionization state, i.e. hydrogen-like. The number density of hydrogen can then be written:

$$n_e = \frac{n_1}{n_0 + n_1} N \quad [5]$$

Combining with equation [2] results in:

$$\frac{n_1^2}{n_0(n_0+n_1)} = \frac{2Z_1}{NZ_0}\left(\frac{2\pi m_e kT}{h^2}\right)^{3/2} e^{-\chi_1/kT} \quad [6]$$

which, by defining $X=n_1/N$, can be rewritten as a simple quadratic equation:

$$\frac{X^2}{1-X} = \frac{2Z_1}{NZ_0}\left(\frac{2\pi m_e kT}{h^2}\right)^{3/2} e^{-\chi_1/kT} \quad [7]$$

The neutral fraction can be estimated as 1 minus this value. While this is not the most precise model for this prediction, it is believed to be sufficiently accurate for this estimate of operating regime, and device parameters.

Once an acceptable level of oxygen contamination in the metal has been determined, the operating temperature can be determined. For the sake of these analyses, an assumption is made that 99.99% pure tantalum is desired, for example. This corresponds to a neutral oxygen fraction below $1\times10^{-4}$.

In calculating the power required to maintain this plasma, of note is that the plasma will be an electronegative plasma including negatively charged ions, Nevertheless, an estimate for an electropositive plasma will be used here although this may overestimate the losses and the required power. The electronegativity of the plasma means that the usual ambipolar diffusion is substantially reduced, thus radial ion losses are also reduced.

Following Ref. [Lieberman, M. A and Lichtenberg, A. J. "Principles of plasma discharges and material processing". John Wiley & Sons. NY, N.Y. 1994], absorbed power will be given by the equation:

$$P_{abs} = e n_i u_B A_{eff} E_T \quad [8]$$

where $P_{abs}$ is the absorbed power in Watts, e is the charge of the electron e=$1.602\times10^{-19}$ C, $n_i$ is the ion density, $u_B$ is the Bohm velocity, $A_{eff}$ is an effective area, and $E_T$ is the total energy lost per ion in eV.

For a predominantly oxygen plasma $E_T$ is about 97 eV. The Bohm velocity is defined as:

$$u_B = \sqrt{\frac{eT_e}{m_i}} \quad [9]$$

where $T_e$ is the electron temperature in eV, and $m_i$ is the ion mass. The effective area is defined as:

$$A_{eff} = 2\pi R(Rh_l + lh_R) \quad [10]$$

where R is the plasma radius in meters, l is the plasma column length in meters, and $h_l$ and $h_R$ are approximated by the expressions:

$$h_l \approx 0.86\left(3+\frac{l}{2\lambda_i}\right)^{-1/2}, \quad [11]$$

-continued
$$h_R \approx 0.80\left(4 + \frac{R}{\lambda_i}\right)^{-1/2}$$

where $\lambda_i$ is the ion mean free path.

If it is assumed that the plasma has a reasonably strong, axial, DC magnetic field, the effective length of the plasma is not important and $A_{\it{eff}}$ reduces to $2\pi R^2 h_l$, losses are essentially only out of the ends.

To illustrate an exemplary embodiment, calculations are presented for the refining of tantalum. From the ionization calculations above, an equilibrium temperature of about 1.5 eV could be chosen. Assuming the oxygen will be in the state $O^+$ or $O_2^+$, and the tantalum, in this case, is $Ta^{++}$ or $Ta^{+++}$, a cut off mass of about 46 amu would be appropriate. This is about half way between the $O_2^+$ effective mass of 32 amu and the $Ta^{+++}$ effective mass of 60.3 amu. Using the filter function, viable operating parameters would be 1 kG for the magnetic field, a radius of 25 cm, and a center voltage of about 165 Volts. Assuming a starting pressure of 5 mTorr in this machine, the expected density would be 1 or $2\times10^{20}$ m$^{-3}$, for about 1 MW of power absorbed. This would yield an oxygen flux of about 0.07 mol/s. Assuming the feedstock is $Ta_2O_5$, this oxygen flux would net about 18 kg/hr of Ta metal.

If a need exists for a hotter temperature, for example 5 eV. In the same machine, size, field strengths, etc. for a starting pressure of 2 mTorr, a density of 5 or $6\times10^{19}$ m$^{-3}$ might be expected, for about 1 MW of power absorbed. This would yield an oxygen flux of about 0.05 mol/s or about 13 kg/hr of Ta metal.

Similar analyses can be performed for other elements of interest.

(IV) Oxygen Scavenging

The destructive effects of oxygen can be reduced by using a hydrogen neutralization scheme such that the hydrogen reacts with the oxygen, turning it back to a neutral particle, or preferably to $H_2O$ to be pumped away. This would also reduce the electrode power requirements. Hydrogen can be introduced in an excited state or in an atomic state. Another way of neutralizing or negating the corrosive effects of the ionic, atomic or diatomic oxygen is by lining the interior of the chamber with graphite such that the graphite sacrificially absorbs the oxygen.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for refining a feed material comprising an ore product in a plasma chamber, comprising: accelerating charged particles in said at least partially ionized feed material;

heating said feed material in a plasma torch coupled to an inlet of said chamber so as to at least partially ionize the feed material in an ionization region as it enters the chamber;

accelerating charged particles in said at least partially ionized feed material;

directing said accelerated charged particles between a set of magnetic field coils disposed at the discharge end of said ionization region and into said chamber to form a plasma pinch between said magnetic field coils;

directing said pinched accelerated charged particles through a magnetic field that is substantially transverse to a general direction of motion of said particles so as to separate different species of said charged particles from one another using Lorentz force separation;

collecting a select one of said species of charged particles on a collector placed at a location chosen in said plasma chamber to intercept said select species corresponding to its mass and charge;

discharging other species of charged constituents from said plasma chamber; and generating a purified product from said ore product.

2. The method of claim 1, said feed material comprising a rare earth material.

3. The method of claim 1, said feed material comprising any of: Tantalum, Titanium, Tungsten, Niobium, Lithium, Palladium, Vanadium, Zirconium, Beryllium, thorium and Uranium.

4. The method of claim 1, said Lorentz force (F) separation corresponding to a cross product of a velocity (v) of said charged constituents of charge (q) and a magnetic field (B) in an electric field (E) according to $F=q(E+v\times B)$.

5. The method of claim 1, further comprising removing said collector from service once it has collected an amount of said selected species and extracting said selected species from said collector then returning said collector to service.

6. The method of claim 1, said further comprising vaporizing said feed material in a plasma torch so as to create a plasma prior to introducing said feed material into said chamber.

7. The method of claim 1, further comprising finely dividing said feed material prior to heating it.

8. The method of claim 1, further comprising removing unwanted gas from said collected species.

9. The method of claim 1, further comprising accelerating said species in a particle accelerator device disposed in a pathway that pre-accelerates said feed material particles prior to injection into said chamber.

10. The method of claim 9, comprising mechanically accelerating said particles using a differential pressure that pushes said particles into the chamber at an elevated velocity.

11. The method of claim 9, comprising accelerating said particles using an electromagnetic field.

12. The method of claim 1, further comprising extracting said collected select species from said collector.

13. The method of claim 1, further comprising extracting said purified product from said collector.

14. The method of 1 wherein said purified product comprises a purified metal.

15. The method of claim 14 wherein said purified metal comprises a purified rare earth material.

16. The method of claim 15 wherein said purified rare earth material comprises any of: Tantalum, Titanium, Tungsten, Niobium, Lithium, Palladium, Vanadium, Zirconium, Beryllium, thorium and Uranium.

17. The method of claim 1, further comprising:

directing said discharged species into a second plasma chamber;

separating a second species from said discharged species in said second plasma chamber; and collecting said second species on a second collector disposed in said second plasma chamber.

18. The method of claim 17, further comprising directing said discharged species between a second set of magnetic field coils disposed within said second chamber to form a second plasma pinch between said second set of magnetic field coils.

* * * * *